United States Patent

Engelhardt

[15] 3,641,449

[45] Feb. 8, 1972

[54] VARIABLE IMPEDANCE SEMICONDUCTOR NETWORK

[72] Inventor: Bjorn H. Engelhardt, Barrington, R.I.

[73] Assignee: Raytheon Company, Lexington, Mass.

[22] Filed: Sept. 29, 1969

[21] Appl. No.: 861,955

[52] U.S. Cl. ....................330/29, 330/145

[51] Int. Cl. ....................H03g 3/30

[58] Field of Search ..............330/29, 145, 86; 325/319, 413; 307/237

[56] References Cited

UNITED STATES PATENTS

| | | | |
|---|---|---|---|
| 3,451,006 | 6/1969 | Grangaard | 330/145 X |
| 3,538,448 | 11/1970 | Harford | 330/29 |
| 2,544,211 | 3/1951 | Barton | 330/29 X |
| 2,810,071 | 10/1957 | Race | 330/32 X |
| 3,205,458 | 9/1965 | Geery | 330/29 X |
| 3,289,088 | 11/1966 | Berger | 330/29 UX |

FOREIGN PATENTS OR APPLICATIONS

| | | | |
|---|---|---|---|
| 1,033,332 | 6/1966 | Great Britain | 330/29 |

*Primary Examiner*—Roy Lake
*Assistant Examiner*—James B. Mullins
*Attorney*—Harold A. Murphy, Joseph D. Pannone and Irving S. Rappaport

[57] ABSTRACT

A transistor circuit in which the transistor as the nonlinear gain element has its AC gain destroyed through the use of an emitter to base capacitance thus making the transistor into a DC voltage divider. This permits operating the transistor in a substantially linear region along a DC resistive load line. Consequently, large magnitude AC signals coupled to the collector are resistively divided down by a voltage divider taken to be the transistor and a series resistor.

1 Claims, 3 Drawing Figures

INVENTOR
BJORN H. ENGELHARDT
BY Irving S. Rappaport
ATTORNEY

INVENTOR
BJORN H. ENGELHARDT
BY Irving S. Rappaport
ATTORNEY

VARIABLE IMPEDANCE SEMICONDUCTOR NETWORK

BACKGROUND OF THE INVENTION

A transistor can be connected so that it operates in a common emitter configuration for DC currents and in a common emitter—common base configuration for AC currents. Thus, it does not fall into one of the three standard circuit configurations which are common base, common emitter or common collector. Such a circuit configuration exhibits performance characteristics which are new and useful.

When a device is connected between the emitter and the base of a transistor which has a low-AC impedance and a high-DC impedance, then the transistor can be made to operate with an AC gain of one while maintaining a high-DC gain. The transistor will then behave like a resistive element where the ohmic value of the resistance can be varied through an external bias voltage or bias current.

Amplitude attenuators are one application in which such a circuit connection can be utilized. In the design of AC amplifiers, servosystems, etc., it is sometimes desirable to attenuate a relatively large AC signal in response to a DC signal without introducing distortion. It furthermore is sometimes desirable to use a solid state approach, use simple circuitry, achieve a fast response time and eliminate the need to filter out harmonics which may have been generated during attenuation. For example, it may be necessary to keep the output of an amplifier at a constant level even if the input amplitude varies.

Prior art circuit configurations use a nonlinear characteristics portion of a semiconductor to attenuate the signal. However, use of a nonlinear portion of a semiconductor device produces distortion, especially if the signal is large. This distortion can be minimized by attenuating the signal, inverting it and then attenuating it again. This process may be repeated several times but requires large repetitive circuit configurations and distortion is still produced. Another method for dealing with distortion is to attenuate and then filter the signal, but this technique is effective at only one frequency.

The present invention discloses a very simple circuit which is capable of attenuating a relatively large AC signal in response to a DC signal without introducing any distortion. This invention permits a transistor to assume the characteristics of a linear resistive element and the value of the resistance can be varied by an externally applied DC voltage or current.

SUMMARY OF THE INVENTION

The above objects and advantages of the present invention as well as others are achieved by providing in an amplitude attenuator circuit a transistor including emitter, collector and base electrodes wherein the improvement comprises an element connected directly between the emitter and base electrodes, the element destroying the AC gain of the transistor so that the transistor becomes a DC voltage divider and operates in a substantially linear region along a DC resistive load line.

DESCRIPTION OF THE PREFERRED EMBODIMENTS

Figures 1, 2:
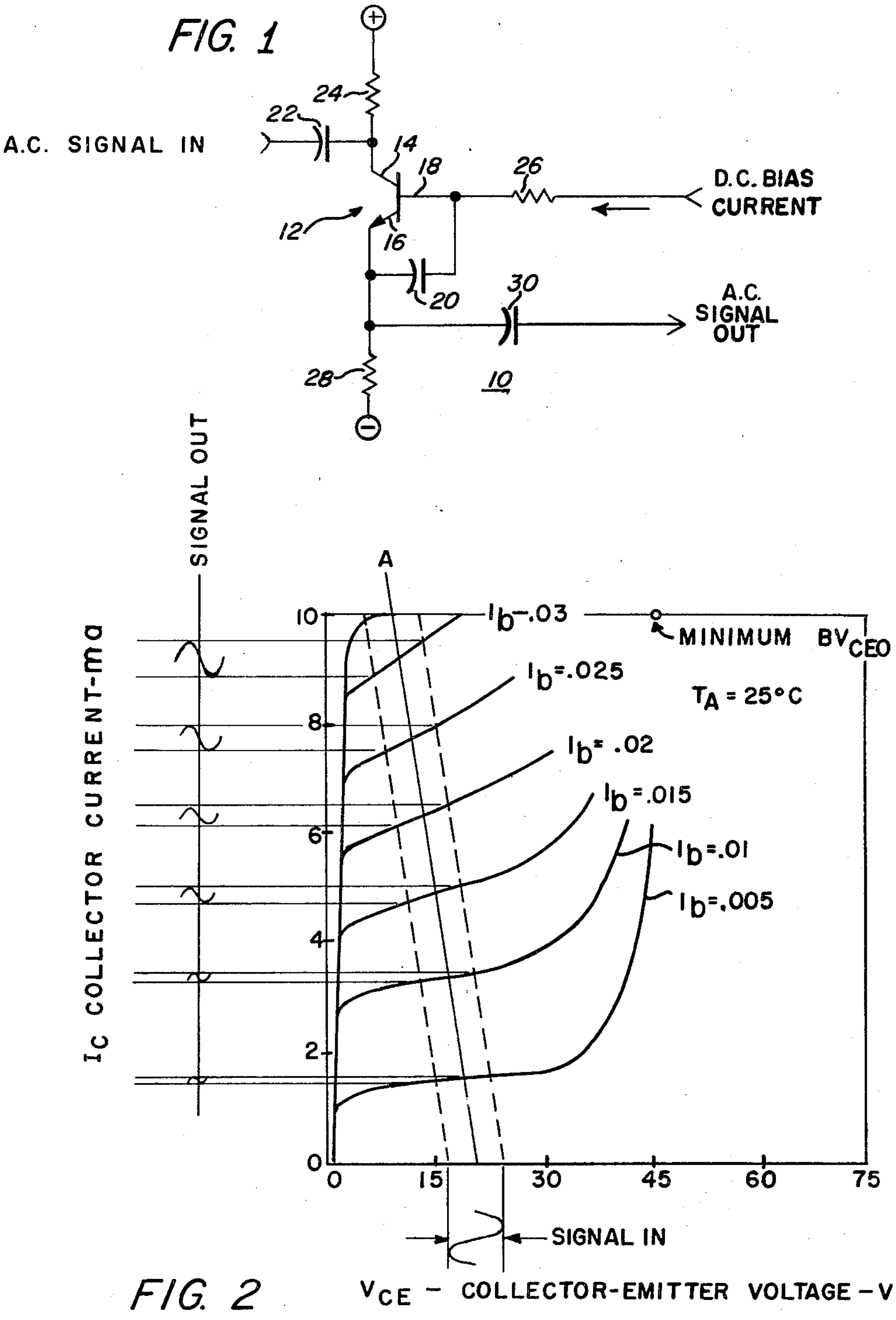
FIG. 1 is a transistor circuit configuration which embodies the present invention.
FIG. 2 shows the common-emitter collector characteristics of a transistor circuit configuration in accordance with the present invention.

FIG. 1 shows a transistor circuit configuration 10 embodying the present invention. The circuit configuration 10 includes a transistor 12 such as a 2N930 transistor. Transistor 12 includes a collector electrode 14, an emitter electrode 16 and a base electrode 18. Transistor 12 is connected so that it does not fall into one of three standard circuit configurations such as common emitter, common base or common collector in that a signal is applied to the collector electrode 14 rather than to the base or emitter electrodes as is done in a standard circuit configuration.

A capacitor 20 is connected between emitter electrode 16 and base electrode 18 and will keep these two electrodes at the same AC potential. An input signal is applied to the collector electrode 14 via a capacitor 22. A positive bias signal is also applied to collector electrode 14 via a resistor 24. To the base electrode 18 is applied a DC bias current via a resistor 26. A negative bias signal is coupled to the emitter electrode 16 via a resistor 28. The output signal is obtained from the emitter electrode 16 through a capacitor 30.

Because the capacitor 20 maintains the emitter and base electrodes 16 and 18 respectively at the same AC potential, any AC signal which might be developed across the emitter resistor 28 will be applied equally to the emitter and base electrodes 16 and 18 and no AC amplification can take place. Thereby, attenuation provided by the circuit configuration 10 is independent of an AC signal applied to the collector terminal 14 and is controlled by the bias current applied via resistor 26. In this circuit configuration 10, the DC bias current through resistor 26 determines the DC current of the base electrode 18 which in turn determines the DC current of the collector electrode 14 at a constant collector voltage modulated by the AC signal. It should be pointed out again that an AC signal at the emitter or base electrodes 16 and 18 will not produce a change in the current of base electrode 18.

FIG. 2 shows the common-emitter collector characteristics curve for a 2N930 transistor such as transistor 12 in FIG. 1. Various values of the current of the base electrode 18 are shown for various values of collector electrode 14 current and collector 14—emitter 16 voltage. The base electrode 18 current varies from 0 to 0.03 ma. The load line superimposed on the characteristics curve is shown by line A. By selecting a specific base electrode 18 current, load line and collector electrode 14 voltage, the collector electrode current is fixed.

If an input AC voltage is applied to the collector electrode 14 of the transistor 12 through capacitor 20, then the collector electrode 14 voltage is modulated and the collector electrode current varies as shown by the dotted parallel lines in FIG. 2. This variation in collector electrode current produces a voltage drop across emitter resistor 28 and constitutes the output signal. Since a linear portion of the characteristics curve is used, no distortion results. Furthermore, attenuation has now become a function of an applied DC voltage or current into the base electrode 18 of the transistor 12.

Many variations are possible. For example, resistor 24 and/or resistor 28 may be replaced by inductors. Capacitor 20 may be replaced by a transformer of appropriate turns ratio and the input and output signals can be reversed. The circuit 10 can be used as a variable input device or a variable feedback device. Other modifications or applications are possible.

Figure 3:
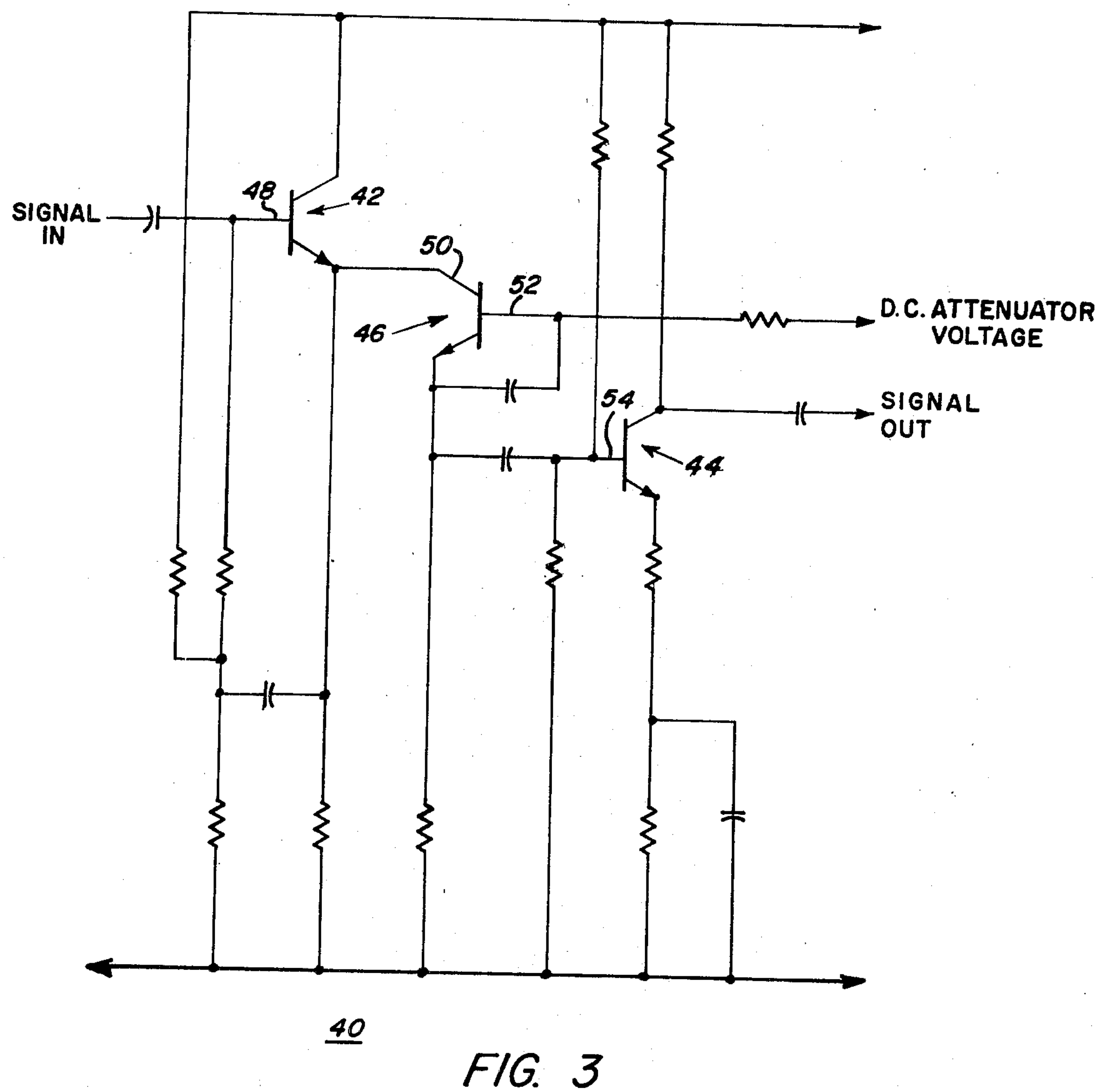
FIG. 3 shows an amplitude attenuator circuit embodying the transistor circuit configuration shown in FIG. 1.

An amplitude attenuator circuit 40 incorporating the present invention is shown in FIG. 3. Here a transistor 42 is used as a high-input impedance stage and a transistor 44 is used as a voltage amplifier. A transistor 46 is the variable attenuator. Operation is as follows. The input signal is applied to the base electrode 48 of transistor 42. Transistor 42 is connected as an emitter follower and applies an AC signal superimposed on a DC voltage to the collector electrode 50 of transistor 46. Transistor 46 attenuates the AC signal in response to a DC attenuation voltage applied to the base electrode 52 as explained previously with respect to FIG. 1. The output from transistor 46 is applied to the base electrode 54 of transistor 44 where it is amplified to provide the output signal.

In tests conducted on the circuit 40 shown in FIG. 5, input signals were varied in amplitude from 0.3-volt RMS to 4-volt RMS. Output signals were varied from 0.3-volt RMS to 5-volt RMS for all values of input signals. Total output distortion varied from 0.55 percent to a maximum of 3.6 percent even at unfavorable signal levels. This distortion is the result of transistor 44 which is connected in a conventional common emitter configuration and operates over a nonlinear portion of its characteristics curve. Transistors 42, 44 and 46 were all 2N930-type transistors.

I claim:

1. An electrical circuit comprising:
- a first transistor having a collector electrode, a base electrode and an emitter electrode;
- a first resistor connected in series with said first transistor such that a current flowing from said collector electrode to said emitter electrode flows through said first resistor;
- capacitor means interconnecting said base electrode and said emitter electrode of said first transistor for inhibiting the AC gain without inhibiting the DC gain of said first transistor;
- a second transistor having a collector electrode, a base electrode, and an emitter electrode, said emitter electrode of said second transistor being connected serially with said first transistor and said first resistor such that a signal carrying current from said emitter electrode of said second transistor flows through said first transistor and said first resistor for attenuating said signal, said second transistor being connected via its base electrode and its emitter electrode to a resistive circuit means to present a high-input impedance stage for electrical signals incident upon said base electrode of said second transistor;
- a resistive means connecting with said base electrode of said first transistor for applying a bias current to said first transistor for adjusting the resistance to the flow of current between said collector electrode and said emitter electrode of said first transistor; and
- a third transistor having a base electrode capacitively coupled to the junction of said first transistor and said first resistor, said third transistor having an emitter electrode and a collector electrode which are connected in a resistor circuit for amplifying AC signals which are attenuated by said series interconnection of said first transistor and said first resistor.

* * * * *